(12) United States Patent
Scheiern et al.

(10) Patent No.: US 12,194,960 B2
(45) Date of Patent: Jan. 14, 2025

(54) SENSOR-BASED BADGE ASSEMBLY FOR CONTROLLING AN ACCESS CLOSURE OF A MOTOR VEHICLE

(71) Applicant: ADAC Plastics, Inc., Grand Rapids, MI (US)

(72) Inventors: Keith Scheiern, Lowell, MI (US); Tyler John Marvin, Caledonia, MI (US); Thomas William Allen, Gowen, MI (US); Anne Adamczyk, Grand Rapids, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 107 days.

(21) Appl. No.: 18/194,998

(22) Filed: Apr. 3, 2023

(65) Prior Publication Data

US 2023/0311813 A1 Oct. 5, 2023

Related U.S. Application Data (60) Provisional application No. 63/326,971, filed on Apr. 4, 2022.

(51) Int. Cl.
*B60R 25/34* (2013.01)
*B60R 13/00* (2006.01)

(52) U.S. Cl.
CPC ............ *B60R 25/34* (2013.01); *B60R 13/005* (2013.01)

(58) Field of Classification Search
CPC .............................. B60R 25/34; B60R 13/005
USPC ....................................................... 340/5.72
See application file for complete search history.

(56) References Cited

U.S. PATENT DOCUMENTS

| | | | |
|---|---|---|---|
| 9,543,948 B2 | 1/2017 | Curtis et al. | |
| 9,860,430 B1 | 1/2018 | Penza et al. | |
| 10,023,110 B1 | 7/2018 | Salter et al. | |
| 10,329,829 B2 * | 6/2019 | Matsui | B60R 13/00 |
| 10,336,295 B2 | 7/2019 | Heller et al. | |
| 10,438,758 B2 * | 10/2019 | Kim | B60R 16/005 |

(Continued)

FOREIGN PATENT DOCUMENTS

| | | |
|---|---|---|
| EP | 1428725 A1 | 6/2004 |
| EP | 3099542 B1 | 4/2020 |
| JP | 2021028621 A | 2/2021 |

OTHER PUBLICATIONS

International Search Report and Written Opinion for counterpart application PCT/US23/65275, mailed Jul. 21, 2023.

*Primary Examiner* — Zhen Y Wu
(74) *Attorney, Agent, or Firm* — Barnes & Thornburg LLP (57) ABSTRACT

A badge assembly may include a badge having a display surface and an opposite mounting surface, and a sensor module mountable to a motor vehicle and including a deflectable wall with an electrically conductive film affixed thereto, and at least one sensor spaced apart from the electrically conductive film and configured to produce at least one sensor signal. The badge is mounted to the deflectable wall with at least one protrusion extending between and in contact with the mounting surface and the deflectable wall. The at least one protrusion concentrates force applied to the display surface of the badge to the deflectable wall to cause the deflectable wall to deflect toward the at least one sensor to produce a detectable change in the at least one sensor signal, the detectable change in the at least one sensor signal causing a change of state of the access closure.

20 Claims, 6 Drawing Sheets

(56) References Cited

U.S. PATENT DOCUMENTS

| | | | |
|---|---|---|---|
| 10,542,606 B2 | 1/2020 | Salter et al. | |
| 10,946,815 B1 | 3/2021 | Salter et al. | |
| 11,872,927 B2 | 1/2024 | James et al. | |
| 2003/0216817 A1* | 11/2003 | Pudney | E05B 81/78 |
| | | | 340/541 |
| 2005/0115810 A1 | 6/2005 | Spies | |
| 2008/0237009 A1* | 10/2008 | Weisz-Margulescu | H01H 13/86 |
| | | | 200/302.1 |
| 2010/0072050 A1* | 3/2010 | Kubota | E05B 83/16 |
| | | | 200/341 |
| 2011/0121942 A1* | 5/2011 | Geldmacher | H01H 13/86 |
| | | | 70/283.1 |
| 2011/0278407 A1* | 11/2011 | Osiecki | G09F 7/18 |
| | | | 29/525.04 |
| 2015/0138796 A1* | 5/2015 | Salter | B60Q 1/0011 |
| | | | 362/510 |
| 2016/0349300 A1* | 12/2016 | Sugiura | E05B 81/76 |
| 2017/0080785 A1* | 3/2017 | Azarko | B60R 13/105 |
| 2017/0166167 A1 | 6/2017 | Heller et al. | |
| 2017/0364086 A1 | 12/2017 | Williams et al. | |
| 2018/0141493 A1* | 5/2018 | Salter | G09F 13/18 |
| 2018/0247777 A1* | 8/2018 | Kim | B60R 16/005 |
| 2022/0328261 A1* | 10/2022 | Buschmann | G05G 25/00 |
| 2022/0328263 A1* | 10/2022 | Buschmann | G05G 5/05 |
| 2022/0336162 A1 | 10/2022 | Boczek et al. | |

\* cited by examiner

SENSOR-BASED BADGE ASSEMBLY FOR CONTROLLING AN ACCESS CLOSURE OF A MOTOR VEHICLE

CROSS-REFERENCE TO RELATED APPLICATION

This application claims priority to U.S. Provisional Patent Application No. 63/326,971, filed Apr. 4, 2022, the disclosure of which is expressly incorporated herein by reference in its entirety.

FIELD OF THE INVENTION

The present invention relates generally to closure access control assemblies for motor vehicles, and more specifically to motor vehicle badge assemblies including sensor-based closure access control features.

BACKGROUND

Closure access control assemblies for motor vehicles are generally known. Decorative and/or informative motor vehicle badge assemblies are also generally known. It may be desirable to integrate sensor-based closure access control features into motor vehicle badge assemblies.

SUMMARY

The present invention may comprise one or more of the features recited in the attached claims, and/or one or more of the following features and combinations thereof. In a first aspect, a badge assembly, for controlling an access closure of a motor vehicle, may comprise a motor vehicle badge having a display surface and a mounting surface opposite the display surface, and a sensor module configured to be mounted to the motor vehicle and including a deflectable wall with a front surface and a rear surface opposite the front surface, an electrically conductive film affixed to the rear surface of the deflectable wall, and a sensor circuit including a sensor spaced apart from the electrically conductive film and configured to produce a sensor signal, wherein the mounting surface of the badge or the front surface of the deflectable wall includes at least one protrusion extending away therefrom, and wherein the badge is mounted to the sensor module with the at least one protrusion extending in contact with and between the mounting surface of the badge and the front surface of the deflectable wall, and wherein the at least one protrusion is configured to concentrate force applied to the display surface of the badge to the deflectable wall to cause the deflectable wall to deflect toward the sensor, and wherein the sensor is configured to produce a detectable change in the sensor signal in response to deflection of the deflectable wall to within a detection proximity of the sensor, the detectable change in the sensor signal causing a change of state of the access closure.

A second aspect may include the features of the first aspect, and wherein the sensor module may comprise a housing including the deflectable wall, and a rear portion coupled to the deflectable wall and configured to be mounted to the motor vehicle, the rear portion of the housing defining a pocket open to the electrically conductive film affixed to the rear surface of the deflectable wall, the sensor circuit mounted in the pocket.

A third aspect may include the features of the second aspect, and wherein the sensor circuit may include a circuit board having the sensor operatively mounted thereto, and a formable medium securing the circuit board in the pocket.

A fourth aspect may include the features of any one or more of the first through third aspects, and wherein the sensor module may include first and second sensors positioned side by side and each spaced apart from the electrically conductive film affixed to the rear surface of the deflectable wall, the first sensor configured to produce a first sensor signal and the second sensor configured to produce a second sensor signal, and wherein the at least one protrusion includes first and second protrusions spaced apart from one another, and wherein the badge is mounted to the sensor module with the first protrusion extending in contact with and between the mounting surface of the badge and the front surface of a first portion of the deflectable wall that extends over the first sensor and with the second protrusion extending in contact with and between the mounting surface of the badge and a second portion of the front surface of the deflectable wall that extends over the second sensor, and wherein the first protrusion is configured to concentrate force applied to the display surface of the badge to the first portion of the deflectable wall to cause the first portion of the deflectable wall to deflect toward the first sensor, and the second protrusion is configured to concentrate force applied to the display surface of the badge to the second portion of the deflectable wall to cause the second portion of the deflectable wall to deflect toward the second sensor, and wherein the first sensor is configured to produce a detectable change in the first sensor signal in response to deflection of the first portion of the deflectable wall to within a detection proximity of the first sensor, and the second sensor is configured to produce a detectable change in the second sensor signal in response to deflection of the second portion of the deflectable wall to within a detection proximity of the second sensor, and wherein the detectable change in at least one of the first sensor signal and the second sensor signal causes the change of state of the access closure.

A fifth aspect may include the features of any one or more of the first through third aspects, and wherein the badge may be mounted to the sensor module with the at least one protrusion extending in contact with and between the mounting surface of the badge and the front surface of a portion of the deflectable wall that extends over the sensor, and wherein the at least one protrusion is configured to concentrate force applied to the display surface of the badge to the deflectable wall to cause the deflectable wall to deflect toward the sensor, and wherein the sensor is configured to produce a detectable change in the sensor signal in response to deflection of the portion of the deflectable wall to within a detection proximity of the sensor, the detectable change in the sensor signal causing a change of state of the access closure.

A sixth aspect may include the features of any one or more of the first through third aspects, and may further comprise a plurality of protrusions extending away from the mounting surface of the badge or the front surface of the deflectable wall, and wherein the badge is mounted to the sensor module with each of the plurality of protrusions extending in contact with and between the mounting surface of the badge and the front surface of the deflectable wall, and wherein each of the plurality of protrusions is configured to concentrate force applied to the display surface of the badge to the deflectable wall to cause the deflectable wall to deflect toward the sensor.

A seventh aspect may include the features of any one or more of the first through third and sixth aspects, and wherein the sensor circuit may include a plurality of sensors each spaced apart from the electrically conductive film and configured to produce a respective sensor signal, and wherein each of the plurality of sensors is configured to produce a detectable change in the respective sensor signal in response to deflection of the deflectable wall to within a detection proximity of the respective sensor, the detectable change in at least one of the plurality of sensor signals causing a change of state of the access closure.

An eighth aspect may include the features of any one or more of the first through seventh aspects, and may further comprise a bonding medium disposed between the mounting surface of the badge and the front surface of the deflectable wall and configured to bond the badge and the sensor module to one another.

A ninth aspect may include the features of the eighth aspect, and wherein the bonding medium may comprise adhesive foam tape.

A tenth aspect may include the features of any one or more of the first through ninth aspects, and wherein the detectable change in the sensor signal may cause the change of state of the access closure from at least one of an unlocked state to a locked state, a locked state to an unlocked state, a latched state to an unlatched state, an unlatched state to a latched state, a closed state to an open state and an open state to a closed state.

An eleventh aspect may include the features of any one or more of the first through tenth aspects, and wherein the mounting surface of the badge may be a rigid structure.

A twelfth aspect may include the features of the eleventh aspect, and wherein the display surface of the badge may a rigid surface such that the badge is a rigid structure.

In a thirteenth aspect, a badge assembly, for controlling an access closure of a motor vehicle, may comprise a motor vehicle badge having a display surface and a mounting surface, opposite the display surface, with a protrusion extending away from the mounting surface, and a sensor module configured to be mounted to the motor vehicle and including a deflectable wall, an electrically conductive film affixed to one surface of the deflectable wall, and a sensor circuit including a sensor spaced apart from the electrically conductive film and configured to produce a sensor signal, the badge mounted to the sensor module with the protrusion in contact with a portion of the deflectable wall that extends over the sensor, wherein the protrusion is configured to concentrate force applied to the display surface of the badge to the portion of the deflectable wall to cause the portion of the deflectable wall to deflect toward the sensor, and wherein the sensor is configured to produce a detectable change in the sensor signal in response to deflection of the portion of the deflectable wall to within a detection proximity of the sensor, the detectable change in the sensor signal causing a change of state of the access closure.

A fourteenth aspect may include the features of the thirteenth aspect, and wherein the sensor module may comprise a housing including the deflectable wall, and a rear portion coupled to the deflectable wall and configured to be mounted to the motor vehicle, the rear portion of the housing defining a pocket open to the electrically conductive film affixed to the one surface of the deflectable wall, the sensor circuit mounted in the pocket.

A fifteenth aspect may include the features of the fourteenth aspect, and wherein the sensor circuit may include a circuit board having the sensor operatively mounted thereto, and a formable medium securing the circuit board in the pocket.

A sixteenth aspect may include the features of any one or more of the thirteenth through fifteenth aspects, and may further comprise at least two locator openings defined in one of the deflectable wall of the sensor module and the mounting surface of the badge, and at least two locator pins extending from the other of the deflectable wall of the sensor module and the mounting surface of the badge, wherein the at least two locator openings and the at least two locator pins are positioned such that mounting the badge to the sensor module with the at least two locator pins received within respective ones of the least two locator openings positions the protrusion over the sensor.

A seventeenth aspect may include the features of any one or more of the thirteen through sixteenth aspects, and wherein the sensor module may include first and second sensors positioned side by side and each spaced apart from the electrically conductive film affixed to the one surface of the deflectable wall, the first sensor configured to produce a first sensor signal and the second sensor configured to produce a second sensor signal, wherein the protrusion includes first and second protrusions spaced apart from one another along the mounting surface of the badge, and wherein the badge is mounted to the sensor module with the first protrusion in contact with a first portion of the deflectable wall that extends over the first sensor and with the second protrusion in contact with a second portion of the deflectable wall that extends over the second sensor, and wherein the first protrusion is configured to concentrate force applied to the display surface of the badge to the first portion of the deflectable wall to cause the first portion of the deflectable wall to deflect toward the first sensor, and the second protrusion is configured to concentrate force applied to the display surface of the badge to the second portion of the deflectable wall to cause the second portion of the deflectable wall to deflect toward the second sensor, and wherein the first sensor is configured to produce a detectable change in the first sensor signal in response to deflection of the first portion of the deflectable wall to within a detection proximity of the first sensor, and the second sensor is configured to produce a detectable change in the second sensor signal in response to deflection of the second portion of the deflectable wall to within a detection proximity of the second sensor, and wherein the detectable change in at least one of the first sensor signal and the second sensor signal causes the change of state of the access closure.

An eighteenth aspect may include the features of the seventeenth aspect, and may further comprise at least two locator openings defined in one of the deflectable wall of the sensor module and the mounting surface of the badge, and at least two locator pins extending from the other of the deflectable wall of the sensor module and the mounting surface of the badge, wherein the at least two locator openings and the at least two locator pins are positioned such that mounting the badge to the sensor module with the at least two locator pins received within respective ones of the least two locator openings positions the first protrusion over the first sensor and positions the second protrusion over the second sensor.

A nineteenth aspect may include the features of any one or more of the thirteenth through eighteenth aspects, and may further comprise a bonding medium disposed between the mounting surface of the badge and the deflectable wall and configured to bond the badge and the sensor module to one another.

A twentieth aspect may include the features of the nineteenth aspect, and wherein the bonding medium may comprise adhesive foam tape.

A twenty first aspect may include any one or more of the thirteenth through twentieth aspects, and wherein the detectable change in the sensor signal may cause the change of state of the access closure from at least one of an unlocked state to a locked state, a locked state to an unlocked state, a latched state to an unlatched state, an unlatched state to a latched state, a closed state to an open state and an open state to a closed state.

A twenty second aspect may include the features of any of the thirteenth through twenty first aspects, and wherein the mounting surface of the badge may be a rigid structure.

A twenty third aspect may include the features of the twenty second aspect, and wherein the display surface of the badge may be a rigid surface such that the badge is a rigid structure.

In a twenty fourth aspect, a badge assembly, for controlling an access closure of a motor vehicle, may comprise a motor vehicle badge having a display surface and a mounting surface opposite the display surface, and a sensor module configured to be mounted to the motor vehicle and including a deflectable wall having a first surface and a second surface opposite the first surface, an electrically conductive film affixed to the first surface of the deflectable wall, a sensor circuit including a sensor spaced apart from the electrically conductive film and configured to produce a sensor signal, and a protrusion extending away from the second surface of the deflectable wall opposite the sensor, the badge mounted to the sensor module with the protrusion in contact with the mounting surface of the badge, wherein the protrusion is configured to concentrate force applied to the display surface of the badge to the deflectable wall to cause the deflectable wall over the sensor to deflect toward the sensor, and wherein the sensor is configured to produce a detectable change in the sensor signal in response to deflection of the portion of the deflectable wall to within a detection proximity of the sensor, the detectable change in the sensor signal causing a change of state of the access closure.

A twenty fifth aspect may include the features of the twenty fourth aspect, and wherein the sensor module may comprise a housing including the deflectable wall, and a rear portion coupled to the deflectable wall and configured to be mounted to the motor vehicle, the rear portion of the housing defining a pocket open to the electrically conductive film affixed to the one surface of the deflectable wall, the sensor circuit mounted in the pocket.

A twenty sixth aspect may include the features of the twenty fifth aspect, and wherein the sensor circuit may include a circuit board having the sensor operatively mounted thereto, and a formable medium securing the circuit board in the pocket.

A twenty seventh aspect may include the features of any one or more of the twenty fourth through twenty sixth aspects, and wherein the sensor module may include first and second sensors positioned side by side and each spaced apart from the electrically conductive film affixed to the first surface of the deflectable wall, the first sensor configured to produce a first sensor signal and the second sensor configured to produce a second sensor signal, and wherein the protrusion includes first and second protrusions spaced apart from one another, the first protrusion extending away from the second surface of the deflectable wall opposite the first sensor, and the second protrusion extending away from the second surface of the deflectable wall opposite the second sensor, and wherein the first protrusion is configured to concentrate force applied to the display surface of the badge to the deflectable wall to cause deflectable wall over the first sensor to deflect toward the first sensor, and the second protrusion is configured to concentrate force applied to the display surface of the badge to the deflectable wall to cause the deflectable wall over the second sensor to deflect toward the second sensor, and wherein the first sensor is configured to produce a detectable change in the first sensor signal in response to deflection of the first portion of the deflectable wall to within a detection proximity of the first sensor, and the second sensor is configured to produce a detectable change in the second sensor signal in response to deflection of the second portion of the deflectable wall to within a detection proximity of the second sensor, and wherein the detectable change in at least one of the first sensor signal and the second sensor signal causes the change of state of the access closure.

A twenty eighth aspect may include the features of any one or more of the twenty fourth through twenty ninth aspects, and may further comprise a bonding medium disposed between the mounting surface of the badge and the deflectable wall and configured to bond the badge and the sensor module to one another.

A twenty ninth aspect may include the features of the twenty eight aspect, and wherein the bonding medium may comprise adhesive foam tape.

A thirtieth aspect may include the features of any one or more of the twenty fourth through twenty ninth aspects, and wherein the detectable change in the sensor signal may cause the change of state of the access closure from at least one of an unlocked state to a locked state, a locked state to an unlocked state, a latched state to an unlatched state, an unlatched state to a latched state, a closed state to an open state and an open state to a closed state.

A thirty first aspect may include the features of any one or more of the twenty fourth through thirtieth aspects, and wherein the mounting surface of the badge may be a rigid structure A thirty second aspect may include the features of the thirty first aspect, and wherein the display surface of the badge may be a rigid surface such that the badge is a rigid structure.

In a thirty third aspect, a sensor module may be configured to be mounted to a motor vehicle and to a mounting surface of a motor vehicle badge such that pressure applied to an opposite display surface of the badge is detectable by the sensor module to control an access closure of a motor vehicle. The sensor module may comprise an electrically conductive film, a sensor circuit including a first sensor spaced apart from the electrically conductive film and configured to produce a first sensor signal, and a deflectable wall with one surface coupled to the electrically conductive film and an opposite surface having a first protrusion extending away therefrom and positioned over the first sensor, wherein the opposite surface of the deflectable wall is configured to be mounted with the first protrusion in contact with the mounting surface of the badge such that the first protrusion is responsive to force applied to the display surface of the badge to cause a corresponding first portion of the deflectable wall over the first sensor to deflect toward the first sensor, and wherein the first sensor is configured to produce a detectable change in the first sensor signal in response to deflection of the first portion of the deflectable wall to within a detection proximity of the first sensor, the detectable change in the first sensor signal causing a change of state of the access closure.

A thirty fourth aspect may include the features of the thirty third aspect, and may further comprise a housing including the deflectable wall, and a rear portion coupled to the deflectable wall and configured to be mounted to the motor vehicle, the rear portion of the housing defining a pocket open to the electrically conductive film and coupled to the deflectable wall, the sensor circuit mounted in the pocket.

A thirty fifth aspect may include the features of the thirty fourth aspect, and wherein the sensor circuit may include a circuit board having the sensor operatively mounted thereto, and a formable medium securing the circuit board in the pocket.

A thirty sixth aspect may include the features of any one or more of the thirty third through thirty fifth aspects, and may further comprise a second sensor, wherein the first and second sensors are positioned side by side and spaced apart from the electrically conductive film coupled to the deflectable wall, and a second protrusion extending away from the opposite surface of the deflectable wall over the second sensor, wherein the opposite surface of the deflectable wall is configured to be mounted with the second protrusion in contact with the mounting surface of the badge such that the second protrusion is responsive to force applied to the display surface of the badge to cause a corresponding second portion of the deflectable wall over the second sensor to deflect toward the second sensor, and wherein the second sensor is configured to produce a detectable change in the second sensor signal in response to deflection of the second portion of the deflectable wall to within a detection proximity of the second sensor, and wherein the detectable change in at least one of the first sensor signal and the second sensor signal causes the change of state of the access closure.

A thirty seventh aspect may include the features of any one or more of the thirty third through thirty sixth aspects, and may further comprise a bonding medium disposed between the deflectable wall and the mounting surface of the badge and configured to bond the deflectable wall to the mounting surface of the badge.

A thirty eighth aspect may include the features of the thirty seventh aspect, and wherein the bonding medium may comprise adhesive foam tape.

A thirty ninth aspect may include the features of any one or more of the thirty third through thirty eighth aspects, and wherein the detectable change in the sensor signal may cause the change of state of the access closure from at least one of an unlocked state to a locked state, a locked state to an unlocked state, a latched state to an unlatched state, an unlatched state to a latched state, a closed state to an open state and an open state to a closed state.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to a sensor-based badge assembly for a motor vehicle including a motor vehicle badge operatively coupled to a sensor module such that the sensor module is responsive to manual force applied to a display surface of the badge to cause a change of state of an access closure of the motor vehicle. As used herein, the term "badge" or "motor vehicle badge" shall be understood to mean an informational plate or assembly having a display surface bearing information of any type, without restriction, and a mounting surface, opposite the display surface, that is to be attached to an outer surface of the motor vehicle in any of a number of different locations. Examples of such motor vehicle badges may include, but are not limited to, one having a display surface bearing an emblem, e.g., in the form of a name, logo and/or other information relating to and/or characteristic, of the company which produced the motor vehicle to which the badge is to be attached, one having a display surface bearing information relating to a model, type or function/capability of the motor vehicle to which the badge is to be attached, e.g., "Mustang," "Hybrid," "4×4," or the like, one having a display surface bearing other information relating to the owner and/or operator of the motor vehicle to which the badge is to be attached, e.g., "Sheriff," Physician/Medical Doctor, Government Official, etc. or the like.

As also used herein, the term "access closure," shall be understood to mean any openable closure device of any type configured to cover and provide access to any access opening of a motor vehicle. Example motor vehicle access closures may include, but are not limited to, a hinged side door, a sliding side door, a rear hatch door, a trunk lid or door, a lid or door covering a storage or other compartment at the front of a motor vehicle, e.g., so-called "frunk," a tailgate, or the like.

As further used herein, the term "state of the access closure" shall be understood to mean the operational state of the access closure, examples of which may include, but are not limited to, one or any combination of a closed or latched state, an open or unlatched state, a locked state and an unlocked state. It follows that a change of state of the access closure shall be understood to mean a change of the access closure from one operational state to another operational state, examples of which may include, but are not limited to, an unlocked state to a locked state, a locked state to an unlocked state, a latched state to an unlatched state, an unlatched state to a latched state, a closed state to an open state and an open state to a closed state. It will be understood that in some embodiments, the access closure may be manually actuatable from one state to another, whereas in other embodiments the access closure may be operatively coupled to one or more motors and/or biasing structures configured to control transition(s) of the access closure from at least one operational state to another. In the former case, as one non-limiting example, a conventional side door may be manually lockable/unlockable, manually unlatched and opened, and manually closed and latched. In the latter case, as another non-limiting example, a powered rear hatch, a powered sliding door and/or a powered trunk (or frunk) lid may be sequentially unlocked, unlatched and opened all under the control of at least one motor and/or biasing structure, or may be sequentially closed, latched and locked all under the control of at least one motor and/or biasing structure.

Figure 1:
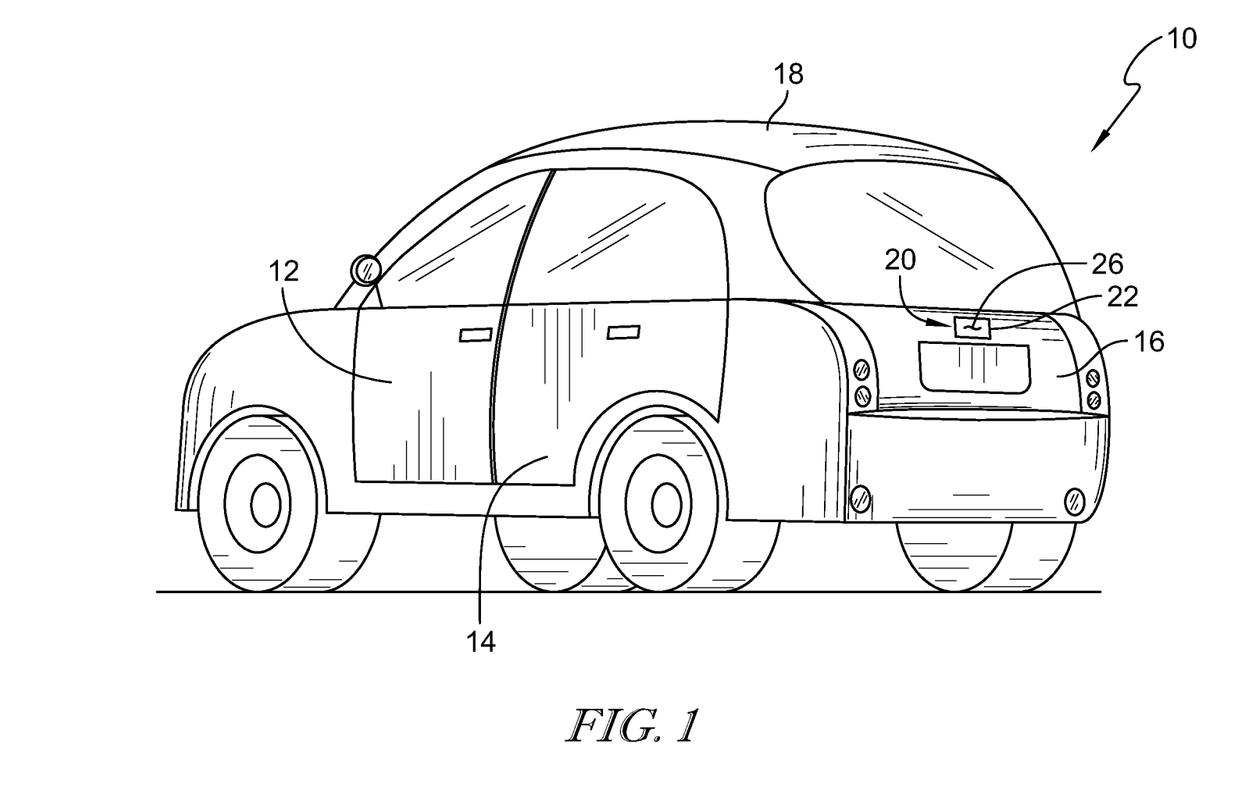
FIG. 1 is a rear perspective view of a sensor-based badge assembly operatively mounted to a rear access closure of a motor vehicle.

Referring now to FIG. 1, an example motor vehicle 10 is shown including a conventional operator side door 12, a conventional passenger side door 14 and a conventional rear hatch door 16 hingedly coupled to the vehicle 10 at or near a roof 18 of the motor vehicle 10. In the illustrated embodiment, a sensor-based badge assembly 20 is illustratively mounted to the outer surface of the rear hatch door 16, and is operable, as briefly described above and as will be described in detail below, to change a state of the rear hatch door 16 by applying a force to the display surface 26 of the badge 22 of the badge assembly 20. It will be understood that whereas the badge assembly 20 is depicted as being mounted approximately centrally on and to the rear hatch door 16, this depiction is provided only by way of example. In some alternate embodiments, the badge assembly 20 may be mounted elsewhere on or adjacent to the door 16. Alternatively or additionally, the badge assembly 20 or another badge assembly 20 may be mounted to, or adjacent to, the door 12 and/or the door 14. Generally, it will be understood that the badge assembly 20 illustrated in FIGS. 2-12 and described below may be mounted to, or adjacent to, any access closure of any motor vehicle.

Referring now to FIGS. 2-8, an embodiment is shown of the badge assembly 20 depicted by example in FIG. 1. In the illustrated embodiment, the badge assembly 20 includes a motor vehicle badge 22, as defined above, including a mounting side, face or surface 24 and a display side, face or surface 26 opposite the mounting surface 24. In the illustrated embodiment, see, e.g., FIGS. 7 and 8, the mounting surface 24 is an external surface of a mounting plate or strip 24A, and the display surface 26 is an external surface of a display plate or strip 26A secured to the mounting plate in a conventional manner. In alternate embodiments, the mounting plate or strip and the display plate or strip may be of unitary construction. In either case, the illustrated badge 22 forms a gap or channel 23 between the mounting surface 24 and the display surface 26 within which one or more conventional badge components 25, e.g., layer(s), plate(s), strip(s) or other structure(s), is/are received. Illustratively, the mounting plate or strip 24A is formed of a rigid material of conventional composition, e.g., rigid plastic, metal or the like, such that the mounting surface 24 is a rigid mounting surface. In some embodiments, the display plate or strip 26A is likewise formed of a conventional rigid material, such that the display surface 26 is a rigid surface, although in alternate embodiments the display plate or strip 26A, or at least the display surface 26, may be at least partially flexible or semi-rigid. In some embodiments, the badge component(s) 25 is/are formed of conventional rigid material(s), although in alternate embodiments at least one badge component 25 may be at least partially flexible or semi-rigid. In any case, manual force applied to the display surface 26 generally in the direction of the gap or channel 23, e.g., by one or more fingers or hand or other body part of a person or by an object held or otherwise controlled by a person, is transferred by the display plate or strip 26 and badge component(s) 25 to the rigid mounting plate or strip 24A and thus to the rigid mounting surface 24 of the badge 20.

Figure 2:
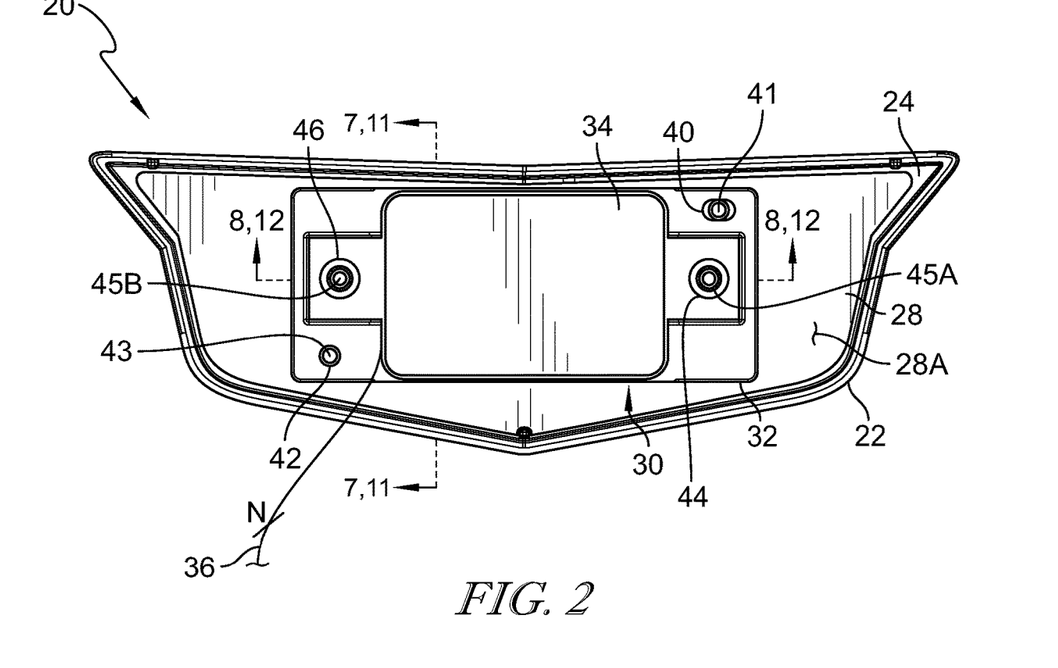
FIG. 2 is a rear elevational view of an embodiment of the sensor-based badge assembly depicted by example in FIG. 1.
Figure 3:
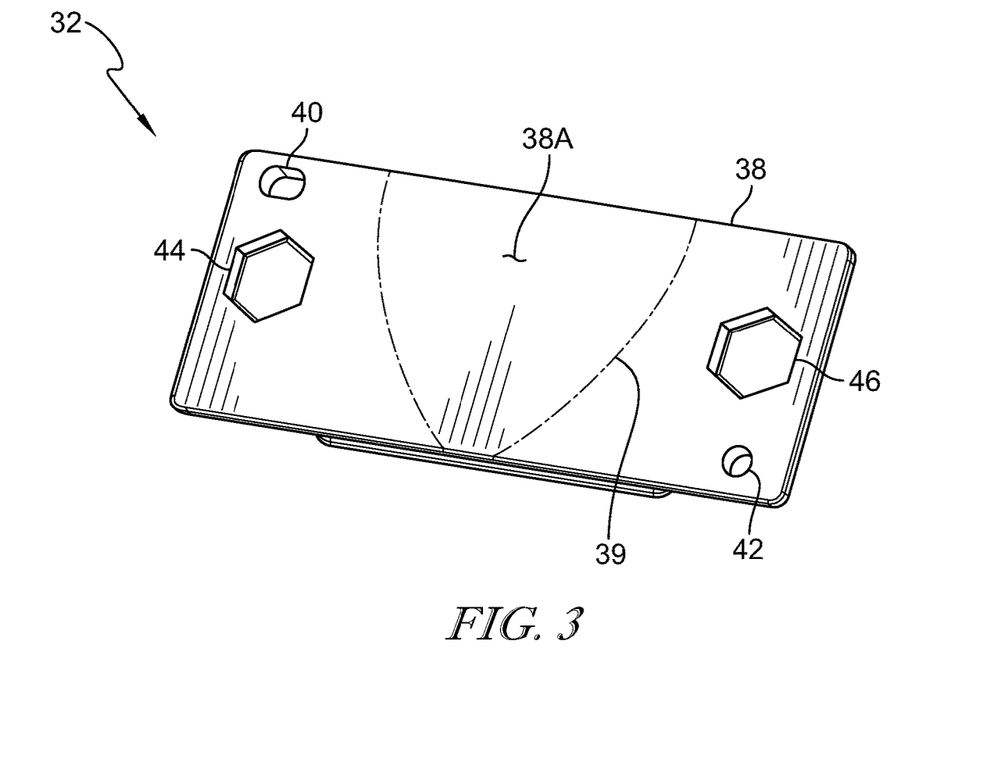
FIG. 3 is a front perspective view of an embodiment of the sensor housing of the badge assembly illustrated in FIG. 2.
Figure 7:
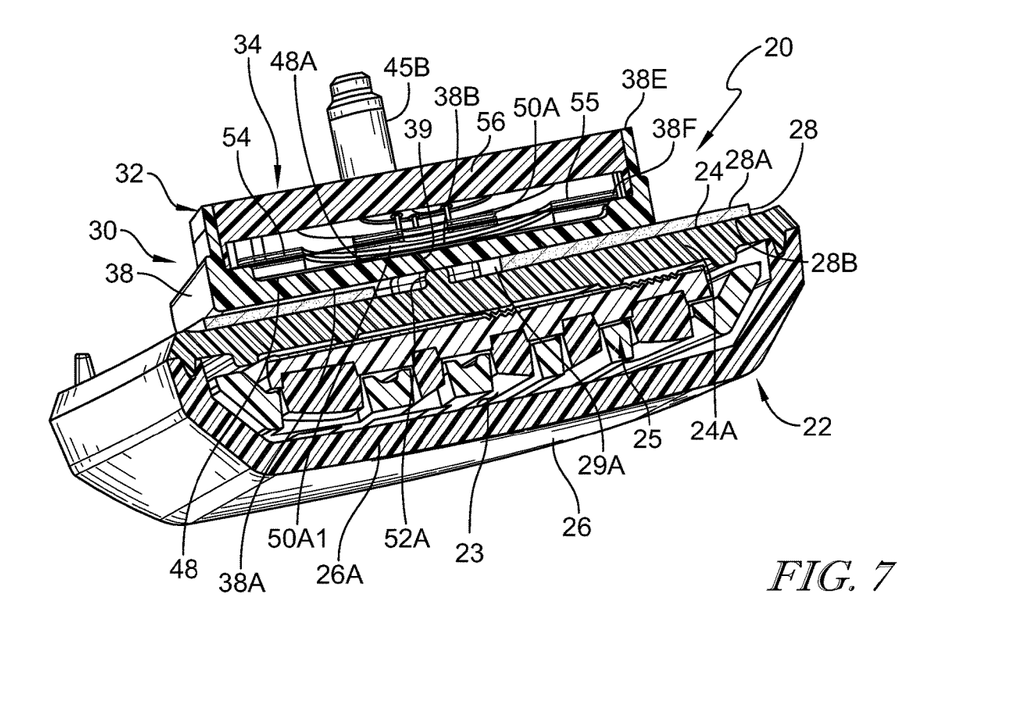
FIG. 7 is a cross-sectional view of the sensor-based badge assembly of FIG. 2, as viewed along section lines 7,11-7, 11, illustrating various components of the sensor module and of the badge.
Figure 8:
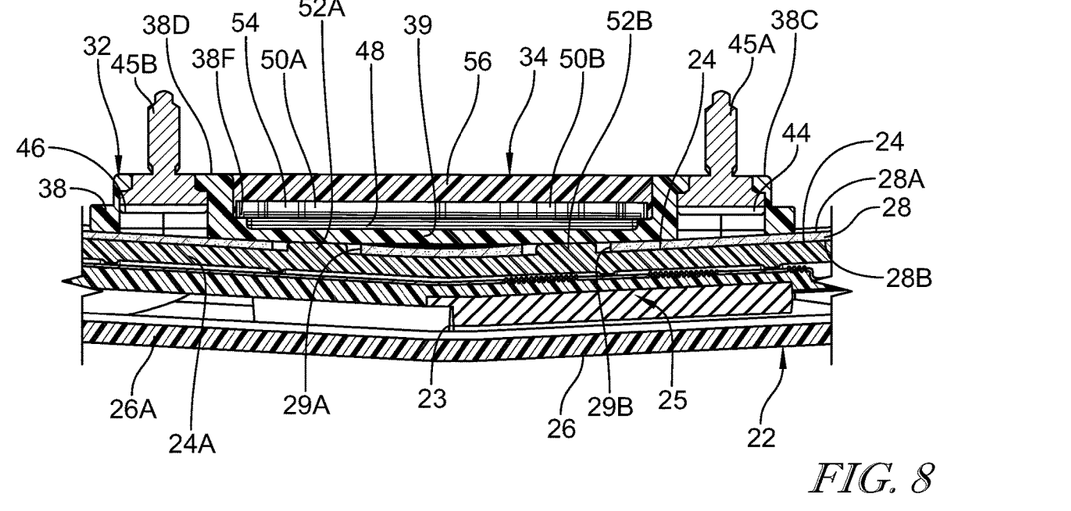
FIG. 8 is a cross-sectional view of the sensor-based badge assembly of FIG. 2, as viewed along section lines 8,12-8, 12, illustrating additional components of the sensor module and of the badge.
Figure 9:
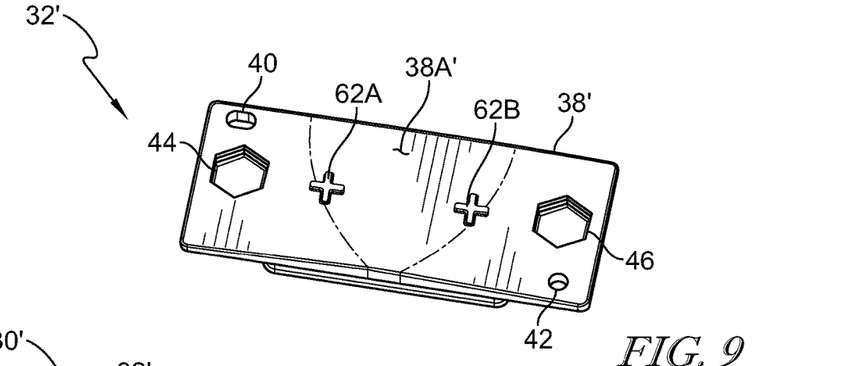
FIG. 9 is a front perspective view of another embodiment of the sensor housing of the badge assembly illustrated in FIG. 2.
Figure 10:
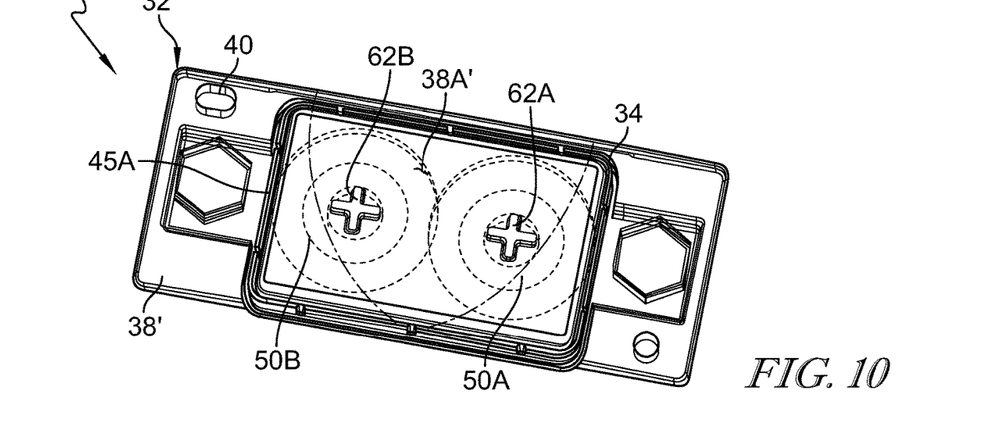
FIG. 10 is a front perspective view of the sensor module of the badge assembly including the housing illustrated in FIG. 9.
Figure 11:
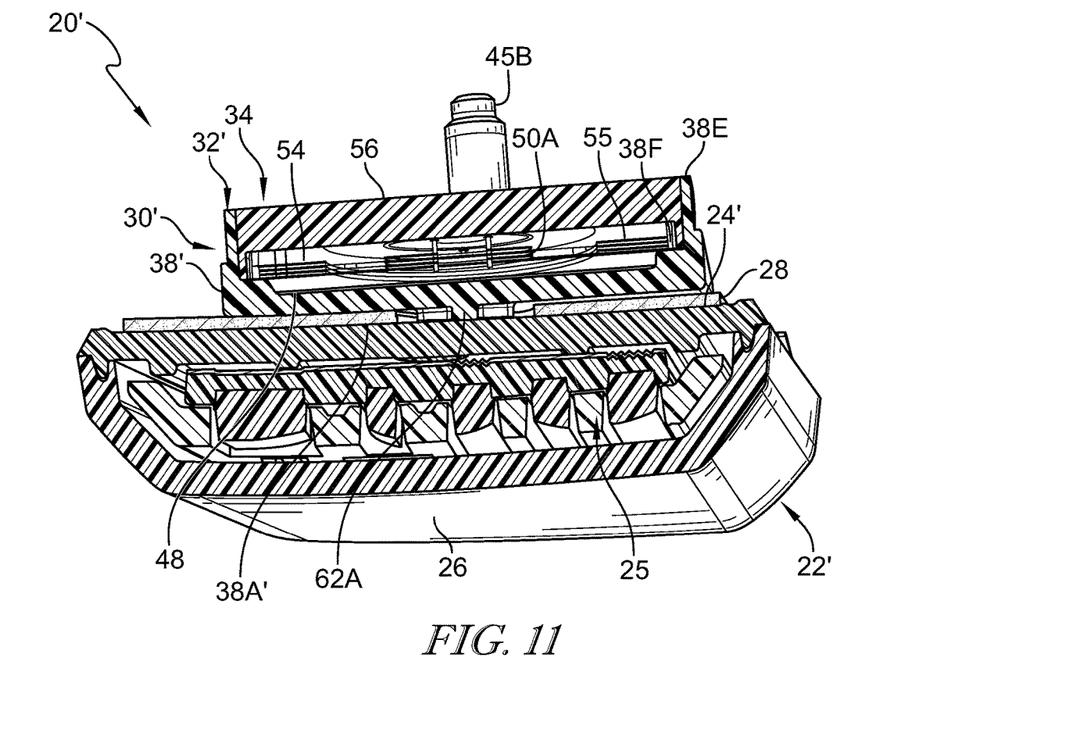
FIG. 11 is a cross-sectional view of the sensor-based badge assembly similar to FIG. 7, as viewed along section lines 7,11-7, 11 of FIG. 2, illustrating various components of the sensor module with the housing illustrated in FIGS. 9 and 10 and with an alternate embodiment of the badge.
Figure 12:
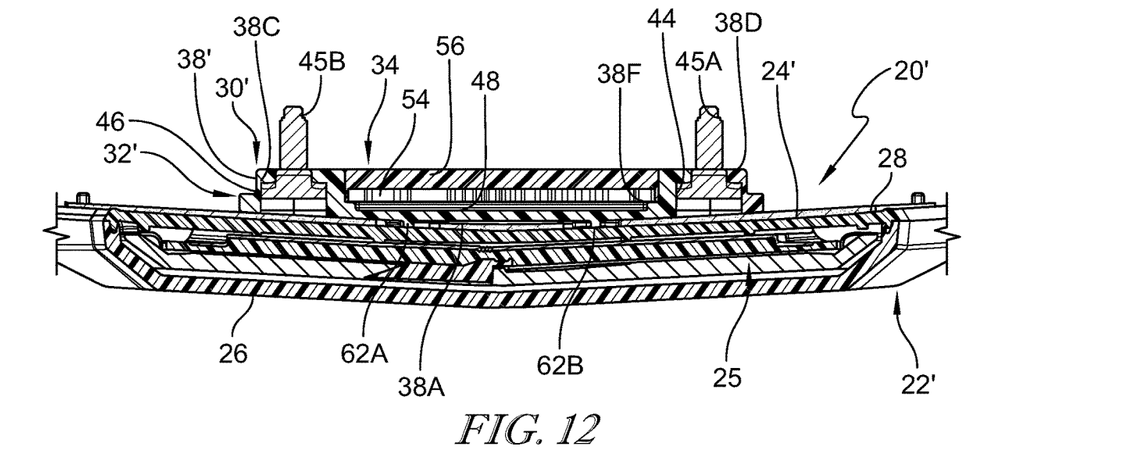
FIG. 12 is a cross-sectional view of the sensor-based badge assembly similar to FIG. 8, as viewed along section lines 8,12-8, 12 of FIG. 2, illustrating additional components of the sensor module with the housing illustrated in FIGS. 9-11 and with the alternate embodiment of the badge.

A sensor module 30 is operatively mounted to the mounting surface 24 of the motor vehicle badge 20 as illustrated by example in FIGS. 2, 7 and 8. In the illustrated embodiment, the sensor module 30 includes a housing 32 to which a sensor circuit 34 is operatively mounted as will be described in detail below. A conventional electrical cable 36 includes any number, N, of electrical wires, wherein N may be any positive integer, and one end of the electrical cable 36, i.e., respective ends of the N electrical wire(s), is/are electrically connected to the sensor circuit 34 in a conventional manner. An opposite end of the electrical cable 36, i.e., respective ends of the N electrical wire(s) is/are configured to be electrically connected to one or more controllers and/or one or more processor circuits of one or more control modules carried by the motor vehicle 10, wherein such one or more control modules is/are configured in a conventional manner to control one or more conventional actuators, e.g., one or more locks, latches, motors, etc., to change the state of the respective access closure of the motor vehicle.

The housing 32 of the sensor module 30 illustratively includes a top or front plate or strip 38 defining a top or front surface 38A and a bottom or rear surface 38B opposite the top or front surface 38A. The top or front plate or strip 38 is illustratively formed of a conventional material, e.g., plastic or the like, having least a wall portion 39 thereof that is deflectable, e.g., flexible, plastically deformable, etc., in a direction generally normal to the rear surface 38B of the top or front plate 38. In some alternate embodiments more or less of the top or front plate or strip 38 than that shown by example in FIGS. 3 and 5 may form the deflectable wall portion 39, and in other alternate embodiments two or more separate portions of the top or front plate or strip 38 may be made to be deflectable. In any embodiment, the deflectable wall portion(s) 39 of the top or front plate or strip 38 is/are illustratively located on the plate or strip 38 so as to be aligned with, e.g., centered over, one or more inductive sensors carried by the sensor circuitry 34. In the illustrated embodiment, as will be described in greater detail below, the sensor circuit 34 illustratively includes two inductive sensors 50A, 50B laterally spaced apart from one another, e.g., side-by-side, and in this embodiment the single deflectable wall 39 of the top or front plate or strip 38 extends at least partially over both sensors 50A, 50B, including the centers of the sensors 50A, 50B as illustrated by example in FIG. 5.

The mounting surface 26 of the mounting plate or strip 26A of the badge 22 is illustratively mounted via a bonding medium 28 to the top or front surface 38A of the top or front plate or strip 38. In one embodiment, the bonding medium 28 is provided in the form of a conventional double-sided, adhesive-backed foam tape having one major surface 28A affixed and bonded to the top or front surface 38A of the top or front plate or strip 38 and an opposite major surface 28B affixed and bonded to the mounting surface 24 of the badge 22, as depicted by example in FIGS. 2, 7 and 8. Illustratively, the compliance of the foam tape 28 allows the mounting surface 24 of the badge 22 to move, relative to the sensor module 30, in response to manual force, e.g., user press, applied to the display surface 26 of the badge 22, thereby facilitating deflection of the deflectable wall 39 of the top or front plate or strip 38 of the sensor housing 32 as described below. In alternate embodiments, the bonding medium 28 may be provided in other conventional forms including, for example, but not limited to, one or more time and/or temperature-curing bonding media, one or more adhesive pastes, gels or liquids, one or more formable bonding media, or the like. In some such embodiments, the formed bonding medium 28 may be compliant as described with respect to the foam tape embodiment. In the illustrated embodiment, locator openings 40 and 42 are defined through the top or front plate or strip 38, e.g., at or near opposite, diagonal corners (see, e.g., FIG. 3), and two respective locator pins 41 and 43 extend, e.g., normally, away from the mounting surface 24 of the badge 20 (see, e.g., FIG. 6), and the locator pins 41, 43 are received within the locator openings 40, 42 as the mounting surface 24 of the badge 22 is mounted to the top or front surface 38A of the top or front plate or strip 38 (see, e.g., FIGS. 2 and 4). The locator openings 40, 42 and the locator pins 41, 43 are illustratively positioned on and relative to the top plate 38 and mounting surface 24 respectively so as to align the sensor(s) carried by the sensor circuitry 34 with respective protrusion(s) extending away from the mounting surface 24 of the badge 22 as will be described in further detail below. In alternate embodiments, at least one of the locator openings 40, 42 may extend into the mounting surface 24 of the badge 22, and at least a corresponding one of the locator pins 41, 43 may extend from the top or front surface 38A of the top or front plate or strip 38.

Figure 4:
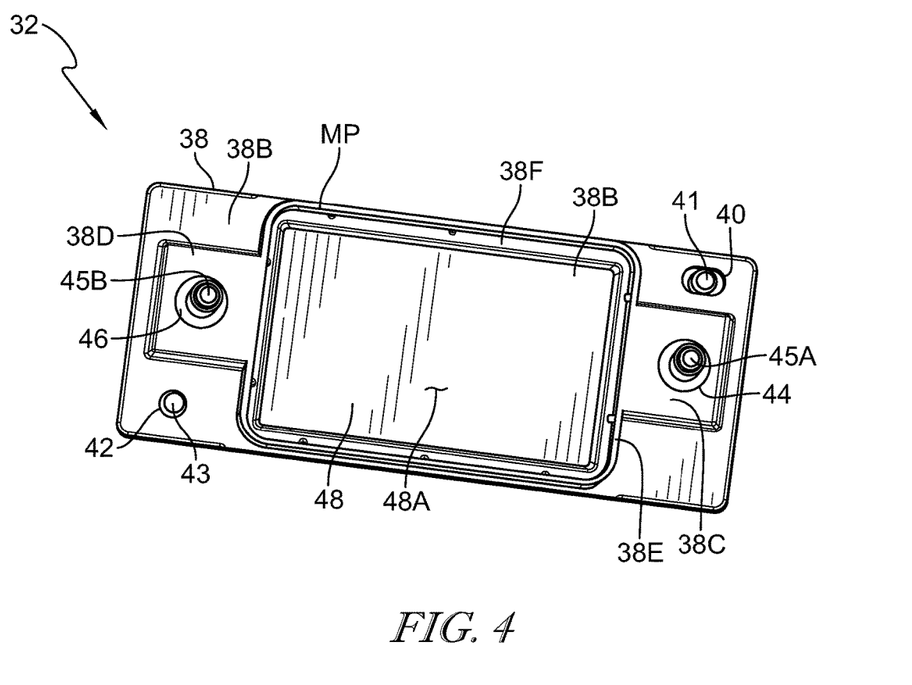
FIG. 4 is a rear perspective view of the sensor housing illustrated in FIG. 3.
Figure 5:
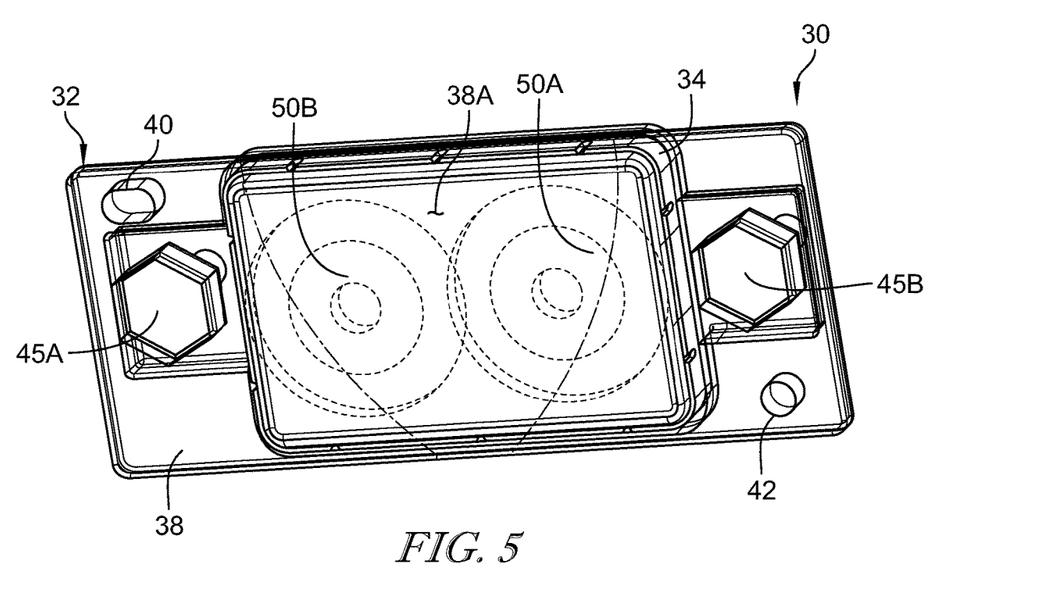
FIG. 5 is a front perspective view of the sensor module of the badge assembly illustrated in FIG. 2.

The housing 32 of the sensor module 30 illustratively includes a mounting projection MP which extends generally perpendicularly away from the rear surface 38B of the top or front plate or strip 38, as best shown in FIG. 4. In the illustrated embodiment, the mounting projection MP and the top or front plate or strip 38 are of unitary construction, although in alternate embodiments the mounting projection MP may be separate from, and affixed in a conventional manner to, the top or front plate or strip 38. The mounting projection MP illustratively defines mounting wings 38C and 38D spaced laterally apart from one another by a pocket rim 38E. The pocket rim 38E and the portion of the rear surface 38B of the top or front plate or strip 38 surrounded by the pocket rim 38E together define a pocket 38F sized to receive the sensor circuit 34 therein. Mounting holes 44 and 46 are defined through the mounting wings 38C, 38D respectively, and conventional fixation elements 45A, 45B extend into and through the respective mounting holes 44, 46 for mounting the badge assembly 20 to the motor vehicle 10. The pocket rim 38E of the mounting projection MP is illustratively surrounds the deflectable wall portion 39 of the top or front plate or strip 38 such that the sensor circuitry pocket 38F is positioned opposite the deflectable wall 39. As best shown in FIGS. 4, 7 and 8, a conventional electrically conductive film 48 is positioned in the pocket 38F on or adjacent to the rear surface 38B of the top or front plate or strip 38 such that an exposed surface 48A faces the sensor circuitry 34 upon mounting of the sensor circuitry 34 in the pocket 38F. The electrically conductive film 48 is illustratively affixed to at least a portion of the rear surface 38B of the top or front plate or strip 38 in a conventional manner, e.g., via a conventional coating technique, via conventional adhesive or other bonding medium, or the like. In the illustrated embodiment, the electrically conductive film 48 covers the entire portion of the rear surface 38B of the top or front plate or strip 38 surrounded by the pocket rim 38E, as best shown in FIG. 4, although in alternate embodiments the electrically conductive film 48 may cover only portion(s) of the rear surface 38B of the top or front plate or strip 38 opposite respective sensor(s) included in the sensor circuitry 34. In any case, as the deflectable wall portion(s) 39 of the top or front plate or strip 38 is/are deflected toward the sensor circuitry 34, so too is/are the electrically conductive film(s) affixed thereto.

The sensor circuitry 34 illustratively includes at least one inductive sensor, e.g., in the form of a conventional coil sensor. In the illustrated embodiment, which should be understood to be non-limiting and provided only by way of example, the sensor circuitry 34 includes two laterally-spaced apart coil sensors 50A, 50B, although in alternate embodiments more or fewer coil sensors may be included in the sensor circuitry 34. The sensor circuitry 34 further includes additional conventional circuitry 54, e.g., for providing electrical power and for processing signals produced by the coil sensor(s) 50A, 50B, and the coil sensor(s) 50A, 50B and the additional circuitry 54 are operatively mounted to a conventional circuit board 55 and electrically connected together in a conventional manner. Illustratively, the circuit board 55 (carrying the sensor(s) 50A, 50B and the additional circuitry 54) is secured in place within the pocket 38F of the housing 32 via a conventional potting compound 56, although in alternate embodiments the circuit board 55 may be secured within the pocket 38F of the housing 32 using other conventional circuit board attachment structure(s) and/or bonding medium(s) or the like.

Figure 6:
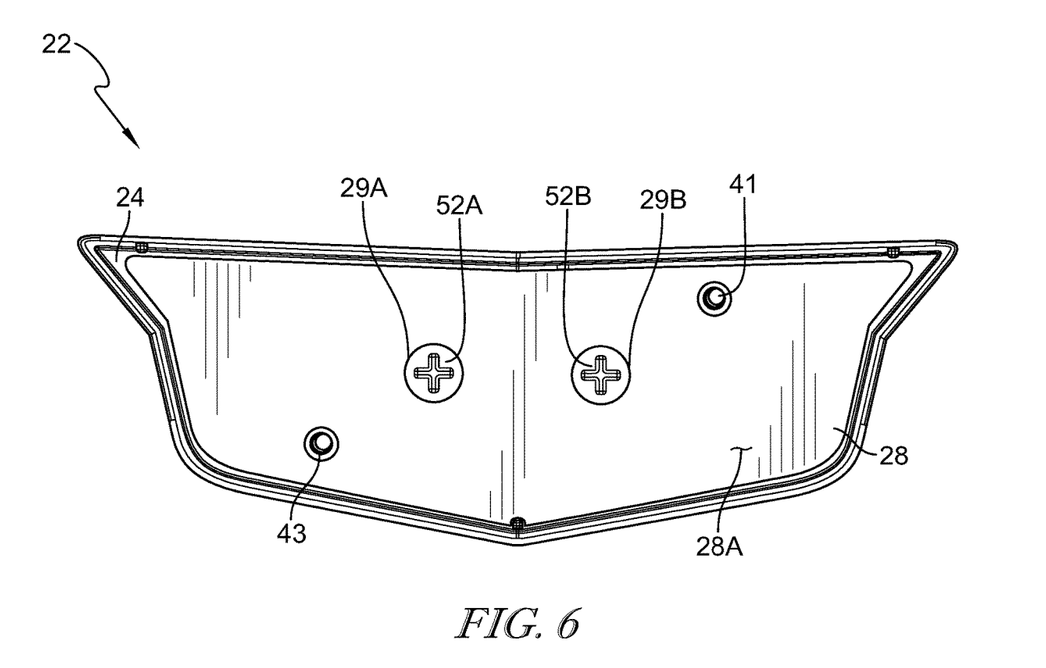
FIG. 6 is a rear elevational view of an embodiment of the badge of the sensor-based badge assembly illustrated in FIG. 2.

In the embodiment illustrated in FIGS. 2-8, the mounting surface 24 of the rear plate or strip 24A of the badge 22 defines laterally spaced apart protrusions 52A, 52B extending therefrom, e.g., extending perpendicularly away therefrom. In the illustrated embodiment, the protrusions 52A, 52B are provided in the form of rigid, elongated pins or posts, each illustratively having "+" cross-sectional shapes as best shown in FIGS. 6-8. In alternate embodiments, the rear plate or strip 24A may be configured to include more or fewer such protrusions and/or with one or more protrusions having any cross-sectional shape without limitation. As also depicted in FIGS. 6-8, the bonding medium 28 defines openings 29A, 29B therethrough, wherein the openings 29A, 29B are positioned such that the protrusions 52A, 52B respectively extend therethough. When the mounting surface 24 of the mounting plate or strip 24A of the badge 22 is mounted to the top or front surface 38A of the top or front plate or strip 38 via the bonding medium 28 as described above, the protrusions 52A, 52B extend through the openings 29A, 29B of the bonding medium 28 between and in rigid contact with the mounting surface 24 of the mounting plate or strip 24A and the top or front surface 38A of the top or front plate or strip 38, whereas remaining portions of the mounting surface 24 of the mounting plate or strip 24A of the badge 22 and the top or front surface 38A of the top or front plate or strip 38 are separated from one another by the bonding medium 28, as best illustrated in FIGS. 7 and 8.

The protrusions 52A, 52B are illustratively located or positioned on the mounting surface of the mounting plate or strip 24A of the badge so as to align with, e.g., be centered over, the coil sensors 50A, 50B respectively. In this regard, the locator openings 40, 42 and the locator pins 41, 43 are illustratively positioned on and relative to the top plate 38 and mounting surface 24 respectively so as to guide the mounting of the badge 22 to the sensor module 30 in a manner which aligns, e.g., centers, the protrusions 52A, 52B over the coil sensors 50A, 50B respectively as the mounting surface 24 of the mounting plate or strip 24A of the badge 22 is mounted to the top or front surface 38A of the top or front plate or strip 38 via the bonding medium 28, as illustrated by example in FIGS. 7 and 8. Such alignment positions the rigid protrusions 52A, 52B in contact with and between the rigid mounting wall 24 of the badge 22 and the deflectable wall 39 of the top or front plate 38 of the sensor module 30, as also depicted by example in FIGS. 7 and 8. The protrusions 52A, 52B are thusly configured to transfer and concentrate force(s) applied to the display surface 26 of the badge 22 to the respective portions of the deflectable wall 39 of the top or front plate or strip 38 that extend over, e.g., centered over, the respective coil sensors 50A, 50B.

The coil sensors 50A, 50B are each illustratively configured in a conventional manner to produce a detectable change in the sensor signal respectively produced thereby in response to deflection of the respective the portion of the deflectable wall 39 of the top or front plate or strip 38 to within a detection proximity thereof. As illustrated most clearly in FIG. 7, the sensor surface 50A1 of the coil sensor 50A is spaced apart from, and faces, the electrically conductive film 48 attached to the planar rear surface 38B of the top or front plate or strip 38 within the sensor module pocket 38F. The sensor 50B is likewise situated relative to the film 48. Deflection of the portion(s) of the deflectable wall 39 which extend over, e.g., centered over, the sensor(s) 50A, 50B in a direction toward the sensor(s) 50A, 50B, e.g., in response to manual force applied to the display surface 26 of the badge 22 as described above, thus causes the electrically conductive film 48 to be displaced toward the sensor(s) 50A, 50B.

Operation of the inductive sensor(s) 50A, 50B is conventional in that the sensor coil(s) 50A, 50B is/are energized by the circuitry 54 on the circuit board 55 to create a sensor output signal in the form of an electromagnetic field adjacent to the sensor surface(s), e.g., 50A1, of the sensor(s) 50A, 50B. In one example embodiment, the circuitry 54 on the circuit board 55 includes at least one capacitive component electrically connected to the sensor coil(s) 50A, 50B such that the capacitive component(s) and the sensor coil(s) 50A, 50B together form resonant circuit(s). Time-varying signal(s) is/are applied to the resonant circuit(s) to produce time-varying electromagnetic field(s). The size(s) of the sensor coil(s) 50A, 50B and the strength(s) of the electromagnetic field(s) established by the energized sensor coil(s) 50A, 50B are selected such that the time-varying electromagnetic field(s) extend across the space between the sensor coil(s) 50A, 50B and respective portions of the electrically conductive film 48. When a respective portion of the deflectable wall 39 deflects inwardly a sufficient distance toward the respective sensor 50A, 50B, the electrically conductive film 48 is displaced to within a detection proximity of that sensor coil 50A, 50B. This results in a measurable loss in the resonant circuit which can be measured as a detectable change in the output signal of the respective sensor 50A, 50B. In one embodiment, this detectable change in the output signal of the respective sensor 50A, 50B is measured as a change in frequency over time, although in alternate embodiments the detectable change may be measured as a change over time in capacitance, inductance and/or resistance, e.g., relative to reference components onboard the circuit board 55.

The detectable change in the sensor signal(s) produced by the sensor(s) 50A, 50B illustratively causes a change of state of the respective access closure, as these terms are defined above. As described above, the electrical wire(s) carried by the electrical cable 36, is/are configured to be electrically connected to one or more controllers and/or one or more processor circuits of one or more control modules carried by the motor vehicle 10, wherein such one or more control modules is/are configured in a conventional manner to control one or more conventional actuators, e.g., one or more locks, latches, motors, etc., to change the state of the respective access closure of the motor vehicle. The detectable change in the sensor signal(s) produced by the sensor(s) 50A, 50B thus cause a change of state of the respective access closure via conventional operation of the one or more controllers and/or one or more processor circuits to control the one or more conventional actuators to physically change the state of the respective access closure in a conventional manner.

Referring now to FIGS. 9-12, an alternate embodiment is shown of a sensor-based badge assembly 20'. The sensor-based badge assembly 20' is identical in many respects to the sensor-based badge assembly 20 illustrated in FIGS. 2-8 and described above, and like numbers are therefore used to identify like components. The sensor-based badge assembly 20' differs from the sensor-based badge assembly 20 in that the mounting surface 24' of the badge 22 does not include the protrusions 52A, 52B, and is instead illustratively planar as depicted by example in FIGS. 11 and 12, and further in that the top or front surface 38A' of the top or front plate or strip 38' of the housing 32' includes two laterally spaced apart protrusions 62A, 62B extending, e.g., perpendicularly, therefrom. In this alternative embodiment, the protrusions 62A, 62B thus replace the protrusions 52A, 52B, and otherwise the structure and operation of the sensor-based badge assembly 20' is identical to the sensor-based badge assembly 20 described in detail above. It will be understood that, like the sensor-based badge assembly 20, the sensor-based badge assembly 20' may include more or fewer protrusions 62A, 62B.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, whereas the example badge assembly 20, 20' has/have been illustrated and described herein as including a single force concentrating protrusion 52A/52B, 62A/62B centered over each sensor 50A, 50B, alternate embodiments are contemplated in which any number of force concentrating protrusions may be used in combination with one or more sensors, wherein one or more of the protrusions may be centered over a respective sensor and/or one or more of the protrusions may not be centered over any sensor. In such alternate embodiments, one or a plurality of force concentrating protrusions may be arranged so as to be responsive to an external force applied, e.g., by a user, to the display surface 26 of the badge 22 to cause the deflectable wall 39 of the top or front plate or strip 38 to deflect sufficiently toward at least one of the one or more sensors so as to produce a detectable change in the sensor signal as described above. As another example, in the above description, the sensors 50A, 50B are described as being inductive sensors, e.g., conventional coil sensors. It will be understood that such sensor embodiments are provided only by way of example and that in alternate embodiments the sensor 50A and/or the sensor 50B, or a single such sensor in embodiments which include only one such sensor, or any one or more of multiple such sensors in embodiments which include more than two such sensors, may be provided in the form of any conventional sensor or sensor assembly configured to produce a detectable change in the sensor signal produced thereby in response to deflection of a corresponding portion of the deflectable wall 39 of the top or front plate or strip 38 to within a detection proximity of the sensor or sensor assembly.

What is claimed is:

1. A badge assembly for controlling an access closure of a motor vehicle, the badge assembly comprising:
   a motor vehicle badge having a display surface and a mounting surface opposite the display surface, and
   a sensor module configured to be mounted to the motor vehicle and including a deflectable wall with a front surface and a rear surface opposite the front surface, an electrically conductive film affixed to the rear surface of the deflectable wall, and a sensor circuit including a sensor spaced apart from the electrically conductive film and configured to produce a sensor signal,
   wherein the mounting surface of the badge or the front surface of the deflectable wall includes at least one protrusion extending away therefrom,
   and wherein the badge is mounted to the sensor module with the at least one protrusion extending in contact with and between the mounting surface of the badge and the front surface of the deflectable wall,
   and wherein the at least one protrusion is configured to concentrate force applied to the display surface of the badge to the deflectable wall to cause the deflectable wall to deflect toward the sensor,
   and wherein the sensor is configured to produce a detectable change in the sensor signal in response to deflection of the deflectable wall to within a detection proximity of the sensor, the detectable change in the sensor signal causing a change of state of the access closure.

2. The badge assembly of claim 1, wherein the sensor module comprises a housing including the deflectable wall, and a rear portion coupled to the deflectable wall and configured to be mounted to the motor vehicle, the rear portion of the housing defining a pocket open to the electrically conductive film affixed to the rear surface of the deflectable wall, the sensor circuit mounted in the pocket.

3. The badge assembly of claim 2, wherein the sensor circuit includes a circuit board having the sensor operatively mounted thereto, and a formable medium securing the circuit board in the pocket.

4. The badge assembly of claim 1, wherein the sensor module includes first and second sensors positioned side by side and each spaced apart from the electrically conductive film affixed to the rear surface of the deflectable wall, the first sensor configured to produce a first sensor signal and the second sensor configured to produce a second sensor signal,
   wherein the at least one protrusion includes first and second protrusions spaced apart from one another,
   and wherein the badge is mounted to the sensor module with the first protrusion extending in contact with and between the mounting surface of the badge and the front surface of a first portion of the deflectable wall that extends over the first sensor and with the second protrusion extending in contact with and between the mounting surface of the badge and a second portion of the front surface of the deflectable wall that extends over the second sensor,
   and wherein the first protrusion is configured to concentrate force applied to the display surface of the badge to the first portion of the deflectable wall to cause the first portion of the deflectable wall to deflect toward the first sensor, and the second protrusion is configured to concentrate force applied to the display surface of the badge to the second portion of the deflectable wall to cause the second portion of the deflectable wall to deflect toward the second sensor,
   and wherein the first sensor is configured to produce a detectable change in the first sensor signal in response to deflection of the first portion of the deflectable wall to within a detection proximity of the first sensor, and the second sensor is configured to produce a detectable change in the second sensor signal in response to deflection of the second portion of the deflectable wall to within a detection proximity of the second sensor,
   and wherein the detectable change in at least one of the first sensor signal and the second sensor signal causes the change of state of the access closure.

5. The badge assembly of claim 1, further comprising a plurality of protrusions extending away from the mounting surface of the badge or the front surface of the deflectable wall,
   and wherein the badge is mounted to the sensor module with each of the plurality of protrusions extending in contact with and between the mounting surface of the badge and the front surface of the deflectable wall,
   and wherein each of the plurality of protrusions is configured to concentrate force applied to the display surface of the badge to the deflectable wall to cause the deflectable wall to deflect toward the sensor.

6. The badge assembly of claim 1, wherein the sensor circuit includes a plurality of sensors each spaced apart from the electrically conductive film and configured to produce a respective sensor signal, and wherein each of the plurality of sensors is configured to produce a detectable change in the respective sensor signal in response to deflection of the deflectable wall to within a detection proximity of the respective sensor, the detectable change in at least one of the plurality of sensor signals causing a change of state of the access closure.

7. The badge assembly of claim 1, further comprising a bonding medium disposed between the mounting surface of the badge and the front surface of the deflectable wall and configured to bond the badge and the sensor module to one another.

8. The badge assembly of claim 7, wherein the bonding medium comprises adhesive foam tape.

9. The badge assembly of claim 1, wherein the detectable change in the sensor signal causes the change of state of the access closure from at least one of an unlocked state to a locked state, a locked state to an unlocked state, a latched state to an unlatched state, an unlatched state to a latched state, a closed state to an open state and an open state to a closed state.

10. The badge assembly of claim 1, wherein the mounting surface of the badge is a rigid structure.

11. The badge assembly of claim 10, wherein the display surface of the badge is a rigid surface such that the badge is a rigid structure.

12. A badge assembly for controlling an access closure of a motor vehicle, the badge assembly comprising:
a motor vehicle badge having a display surface and a mounting surface, opposite the display surface, with a protrusion extending away from the mounting surface, and
a sensor module configured to be mounted to the motor vehicle and including a deflectable wall, an electrically conductive film affixed to one surface of the deflectable wall, and a sensor circuit including a sensor spaced apart from the electrically conductive film and configured to produce a sensor signal, the badge mounted to the sensor module with the protrusion in contact with a portion of the deflectable wall that extends over the sensor,
wherein the protrusion is configured to concentrate force applied to the display surface of the badge to the portion of the deflectable wall to cause the portion of the deflectable wall to deflect toward the sensor,
and wherein the sensor is configured to produce a detectable change in the sensor signal in response to deflection of the portion of the deflectable wall to within a detection proximity of the sensor, the detectable change in the sensor signal causing a change of state of the access closure.

13. The badge assembly of claim 12, further comprising:
at least two locator openings defined in one of the deflectable wall of the sensor module and the mounting surface of the badge, and
at least two locator pins extending from the other of the deflectable wall of the sensor module and the mounting surface of the badge,
wherein the at least two locator openings and the at least two locator pins are positioned such that mounting the badge to the sensor module with the at least two locator pins received within respective ones of the least two locator openings positions the protrusion over the sensor.

14. The badge assembly of claim 12, wherein the sensor module includes first and second sensors positioned side by side and each spaced apart from the electrically conductive film affixed to the one surface of the deflectable wall, the first sensor configured to produce a first sensor signal and the second sensor configured to produce a second sensor signal,
wherein the protrusion includes first and second protrusions spaced apart from one another along the mounting surface of the badge,
and wherein the badge is mounted to the sensor module with the first protrusion in contact with a first portion of the deflectable wall that extends over the first sensor and with the second protrusion in contact with a second portion of the deflectable wall that extends over the second sensor,
and wherein the first protrusion is configured to concentrate force applied to the display surface of the badge to the first portion of the deflectable wall to cause the first portion of the deflectable wall to deflect toward the first sensor, and the second protrusion is configured to concentrate force applied to the display surface of the badge to the second portion of the deflectable wall to cause the second portion of the deflectable wall to deflect toward the second sensor,
and wherein the first sensor is configured to produce a detectable change in the first sensor signal in response to deflection of the first portion of the deflectable wall to within a detection proximity of the first sensor, and the second sensor is configured to produce a detectable change in the second sensor signal in response to deflection of the second portion of the deflectable wall to within a detection proximity of the second sensor,
and wherein the detectable change in at least one of the first sensor signal and the second sensor signal causes the change of state of the access closure.

15. The badge assembly of claim 14, further comprising:
at least two locator openings defined in one of the deflectable wall of the sensor module and the mounting surface of the badge,
and at least two locator pins extending from the other of the deflectable wall of the sensor module and the mounting surface of the badge,
wherein the at least two locator openings and the at least two locator pins are positioned such that mounting the badge to the sensor module with the at least two locator pins received within respective ones of the least two locator openings positions the first protrusion over the first sensor and positions the second protrusion over the second sensor.

16. A badge assembly for controlling an access closure of a motor vehicle, the badge assembly comprising:
a motor vehicle badge having a display surface and a mounting surface opposite the display surface, and
a sensor module configured to be mounted to the motor vehicle and including a deflectable wall having a first surface and a second surface opposite the first surface, an electrically conductive film affixed to the first surface of the deflectable wall, a sensor circuit including a sensor spaced apart from the electrically conductive film and configured to produce a sensor signal, and a protrusion extending away from the second surface of the deflectable wall opposite the sensor, the badge mounted to the sensor module with the protrusion in contact with the mounting surface of the badge,
wherein the protrusion is configured to concentrate force applied to the display surface of the badge to the deflectable wall to cause the deflectable wall over the sensor to deflect toward the sensor,
and wherein the sensor is configured to produce a detectable change in the sensor signal in response to deflection of the portion of the deflectable wall to within a detection proximity of the sensor, the detectable change in the sensor signal causing a change of state of the access closure.

17. The badge assembly of claim 16, wherein the sensor module includes first and second sensors positioned side by side and each spaced apart from the electrically conductive film affixed to the first surface of the deflectable wall, the first sensor configured to produce a first sensor signal and the second sensor configured to produce a second sensor signal,
wherein the protrusion includes first and second protrusions spaced apart from one another, the first protrusion extending away from the second surface of the deflectable wall opposite the first sensor, and the second protrusion extending away from the second surface of the deflectable wall opposite the second sensor,
and wherein the first protrusion is configured to concentrate force applied to the display surface of the badge to the deflectable wall to cause deflectable wall over the first sensor to deflect toward the first sensor, and the second protrusion is configured to concentrate force applied to the display surface of the badge to the deflectable wall to cause the deflectable wall over the second sensor to deflect toward the second sensor,
and wherein the first sensor is configured to produce a detectable change in the first sensor signal in response to deflection of the first portion of the deflectable wall to within a detection proximity of the first sensor, and the second sensor is configured to produce a detectable change in the second sensor signal in response to deflection of the second portion of the deflectable wall to within a detection proximity of the second sensor,
and wherein the detectable change in at least one of the first sensor signal and the second sensor signal causes the change of state of the access closure.

18. The badge assembly of claim 17, wherein the detectable change in the sensor signal causes the change of state of the access closure from at least one of an unlocked state to a locked state, a locked state to an unlocked state, a latched state to an unlatched state, an unlatched state to a latched state, a closed state to an open state and an open state to a closed state.

19. The badge assembly of claim 16, wherein the mounting surface of the badge is a rigid structure.

20. The badge assembly of claim 19, wherein the display surface of the badge is a rigid surface such that the badge is a rigid structure.

* * * * *